United States Patent [19]

Marsch

[11] 3,935,225

[45] Jan. 27, 1976

[54] DEVICE FOR PERFORMING CATALYTIC ENDOTHERMIC REACTIONS

[75] Inventor: Hans-Dieter Marsch, Dortmund-Oespel, Germany

[73] Assignee: Friedrich Uhde GmbH, Dortmund, Germany

[22] Filed: Mar. 4, 1974

[21] Appl. No.: 447,520

[30] Foreign Application Priority Data

Apr. 10, 1973 Germany............................ 2317893

[52] U.S. Cl................ 23/289; 23/288 M; 23/288 K
[51] Int. Cl.$^2$........ B01J 3/02; B01J 3/04; B01J 8/06
[58] Field of Search . 23/289, 288 M, 288 K, 288 R, 23/277 R

[56] References Cited

UNITED STATES PATENTS

| | | | |
|---|---|---|---|
| 1,605,647 | 11/1926 | Claude............................. | 23/289 X |
| 3,147,084 | 9/1964 | Franzen et al. .................. | 23/288 M |
| 3,539,304 | 11/1970 | Mevenkamp et al............. | 23/288 M |
| 3,600,141 | 8/1971 | Mevenkamp et al............. | 23/288 M |
| 3,607,125 | 9/1971 | Kydd............................... | 23/288 M |

*Primary Examiner*—Joseph Scovronek
*Attorney, Agent, or Firm*—Malcolm W. Fraser, Esq.

[57] ABSTRACT

A device for performing catalytic endothermic reactions which comprises a vessel having a heat exchanger provided with cooling tubes which extend through an outer tubesheet of the heat exchanger. These tubes are sealed against the outer tubesheet of the heat exchanger, and are connected rigidly to the inner tubesheet. Reaction tubes are provided with catalyst support grids, and the sections of these tubes below the grids are of a length that is at least equal to the diameter of the respective tubes. Downstream of the support grids, the process gas discharge tubes extend centrally through the catalyst-free portions of the reaction tubes and are spaced from the inner walls of the cooling tubes. The spaces between the process gas discharge tubes and the reaction tubes are filled with insulating material. The process gas discharge tubes, which are disposed within the cooling tubes, may extend to or beyond the outer tubesheets of the heat exchanger. The wall thickness of the process gas tubes below the catalyst support grids may be decreased in cross section, thereby decreasing the heat flux to the inner tubesheet.

5 Claims, 3 Drawing Figures

DEVICE FOR PERFORMING CATALYTIC ENDOTHERMIC REACTIONS

BACKGROUND OF THE INVENTION

A device for performing catalytic endothermic reactions is known from U.S. patent application, Ser. No. 386,942, filed Aug. 9, 1973, now U.S. Pat. No. 3,870,476, issued Mar. 11, 1975, FIGS. 4 through 8. This device comprises catalyst-filled tubes in which hydrocarbons are reformed in the presence of steam at elevated pressure. The heating gas side is also operated at elevated pressure to relieve mechanical stresses to which the tubes are exposed. The final temperature of the process gas generally exceeds 700°C and is preferably higher than 800°C. This hot process gas must be channelled through a multitude of tubes across the reaction vessel bottom head. The particular problem consists in providing for each reaction tube a separate feed and discharge line passing into and leaving the vessel that is pressurized by the heating gas while avoiding any undue enlargement of the vessel or any unjustifiable weakening of the head by a multitude of tube passage apertures. Separate feed and discharge lines are necessary to enable any reaction tube to be sealed off from outside in the event of damage.

The above patent application provides for feeding the hydrocarbons to be processed through individual flexible small size tubes that are capable of compensating thermal expansions. Because of the low feed stream temperature of approximately 500°C the mechanical design at this point involves no problem. Conditions are totally different for the outlet. The high temperature prevailing on both the process gas and heating gas sides precludes for the reaction tubes a normal passage through the head with welding of the tubes into the head. Referring to the above patent application, the design provides for a passage through the head in that the hot gas from the reaction tube is transferred into a small size tube that is seal welded to the head through a cooling cap; the head is cooled by a cooling agent that circulates in a heat exchanger which is attached to the head direct, the cooling agent, for example water, being preferably held at a favorable pressure. In this way, the head separates three fluids in the area of the tube passage, viz. process gas, heating gas, and cooling agent.

This design is not entirely satisfactory in view of the presence of the small size outlet tube requiring additional critical welds and extending to both the heating gas side and water side. Owing to prevailing thermal conditions, this tube must be of a high alloy austenitic steel, while the risk of stress corrosion cracking exists for any austenitic steel on the water side.

SUMMARY OF THE INVENTION

The object of the present invention is to provide for an optimum passage of the hot process gas through the pressure vessel head without abandoning the advantages offered by the device according to the above mentioned patent application, said pressure vessel head being at the same time the inner tubesheet of the attached heat exchanger and being hereinafter referred to as inner tubesheet as compared to the heat exchanger bottom head which is hereinafter referred to as the outer tubesheet.

According to this invention, the problem is solved in that the cooling tubes of the heat exchanger penetrate through the outer tubesheet of the heat exchanger, the tubes being sealed against the outer tubesheet and being connected rigidly to the inner tubesheet, the lower part of the catalyst filled reaction tubes being provided with catalyst support grids, a catalyst-free tube section being left and having a length that is at least equal to the tube diameter, a heat-insulated process gas discharge tube being arranged downstream of the support grid, the process gas discharge tube being located centrally in the catalyst-free reaction tube section and extending without physical contact into the cooling tubes, and the space between process gas discharge tube and reaction tube being filled with insulating material.

It is another feature of the invention that the process gas discharge tube may extend within the cooling tube to or beyond the outer tubesheet of the heat exchanger.

The invention incorporates the particular advantage that austenitic material can be used for the high thermal load on the gas side while avoiding any contact of this austenitic material with the cooling fluid. The head of the pressure vessel (inner tubesheet) containing the heating gas has no physical contact with the reaction tubes carrying the process gas. The catalyst free section of the reaction tube provides for a sufficient lowering of the temperature so that the inner tubesheet between heat exchanger and pressure vessel is exposed to a reduced operating temperature.

DESCRIPTION OF PREFERRED EMBODIMENTS

Figure 1:
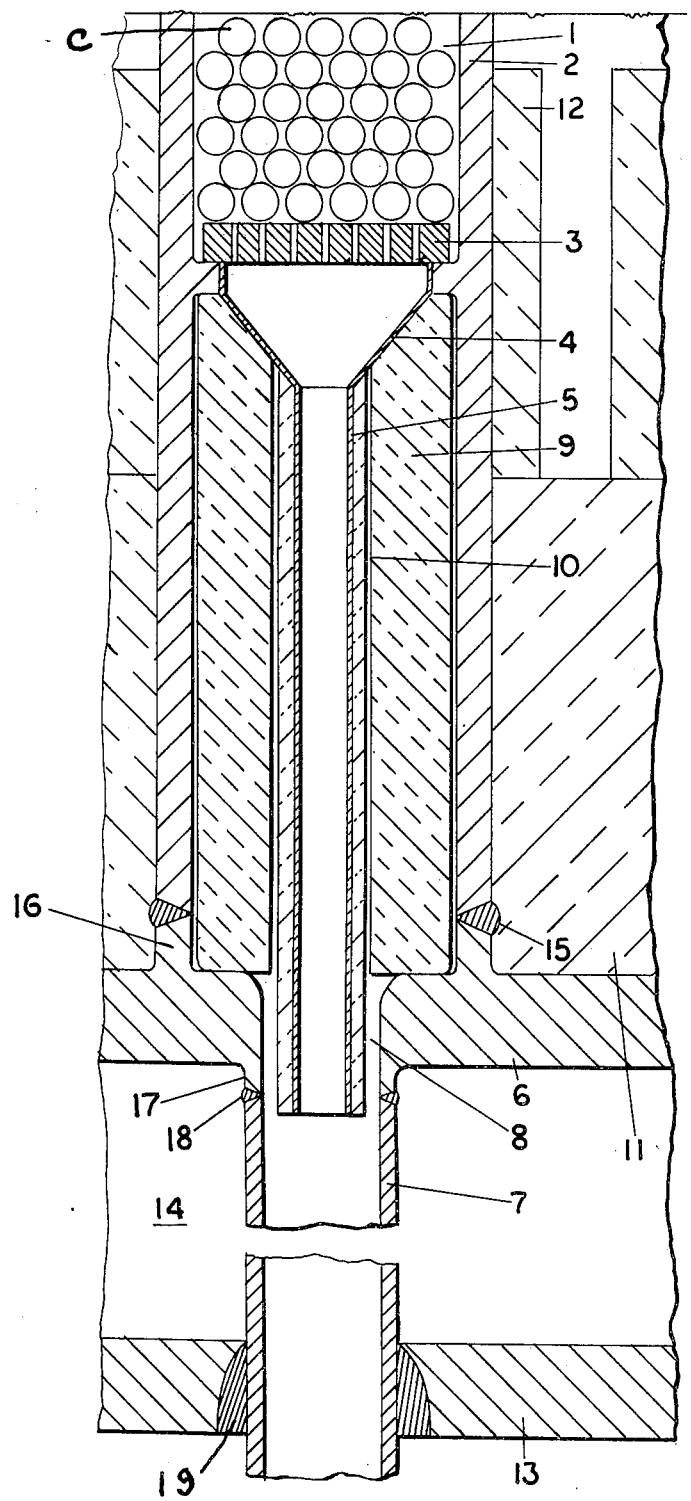
FIG. 1 is a fragmentary vertical sectional elevation of a portion of a pressure vessel showing one of the catalyst-filled reaction tubes and associated structure.

In the form of the invention shown in FIG. 1, a pressure vessel is constructed so that the interior 1 of the reaction tube 2 is filled with a catalyst C and rests on a support grid 3. Below the catalyst support grid 3, a conical tube section 4 fits closely into tube 2. The conical tube section 4 terminates in a process gas discharge tube 5 that extends beyond the bottom head (inner tubesheet) 6 of the internally heat insulated pressure vessel and terminates within a cooling tube 7 to permit the hot process gas to pass through the conical tube section 4 and gas discharge tube 5 into cooling tube 7 without transferring heat by convection to the lower part of tube 2 and to the inner tubesheet 6 at the point of passage.

The heat exchanger compartment 14 between the tubesheets 6 and 13 and around the cooling tubes 7 is filled with a cooling agent, preferably water. To reduce any possible heat transfer by radiation, the space between the gas discharge tube 5 and the tube 2 is filled with a heat insulating material 9, and a separate thin insulating lining 10 encloses the gas discharge tube 5. The bottom head (inner tubesheet) 6 of the pressure vessel must also be provided with heat insulation 11 on the heating gas side. Depending on operating conditions, the part of tube 2 extending beyond the insulation 11 is also provided with an external insulation 12.

Cooling tube 7 is connected by a weld 18 to a depending annular flange 17 on the inner tubesheet 6 and by a weld 19 to the outer tubesheet 13 of the heat exchanger. After cooling, the process gas leaves the cooling tube 7 and can then be allowed to pass in any known way to an accumulator (not shown). The accumulator receives the process gas streams from a plurality of tubes 2, only one tube being shown on the drawing. The lowering of the process gas temperature can be influenced in two principal ways, viz. through the length of the cooling tube 7 and through the length of the insulated process gas discharge tube 5. The design provided for by this invention ensures that the hot process gas can be allowed without risk to pass through the inner tubesheet 6 while the weakening of inner tubesheet 6 through the plurality of necessary tube passage apertures is held within justifiable limits.

Rising from the inner tubesheet 6 is a short annular flange 16 which is rigidly secured to the lower end of the reaction tube 2 by a weld 15. The weld 15 is located in an area where cooling, insulation, and process gas routing combine to reduce the temperature of the tube 2 to a point permitting a change in material of construction from heat-resisting CrNi steel of the tube 2 to normal boiler structural steel for the inner tubesheet 6.

Figure 2:
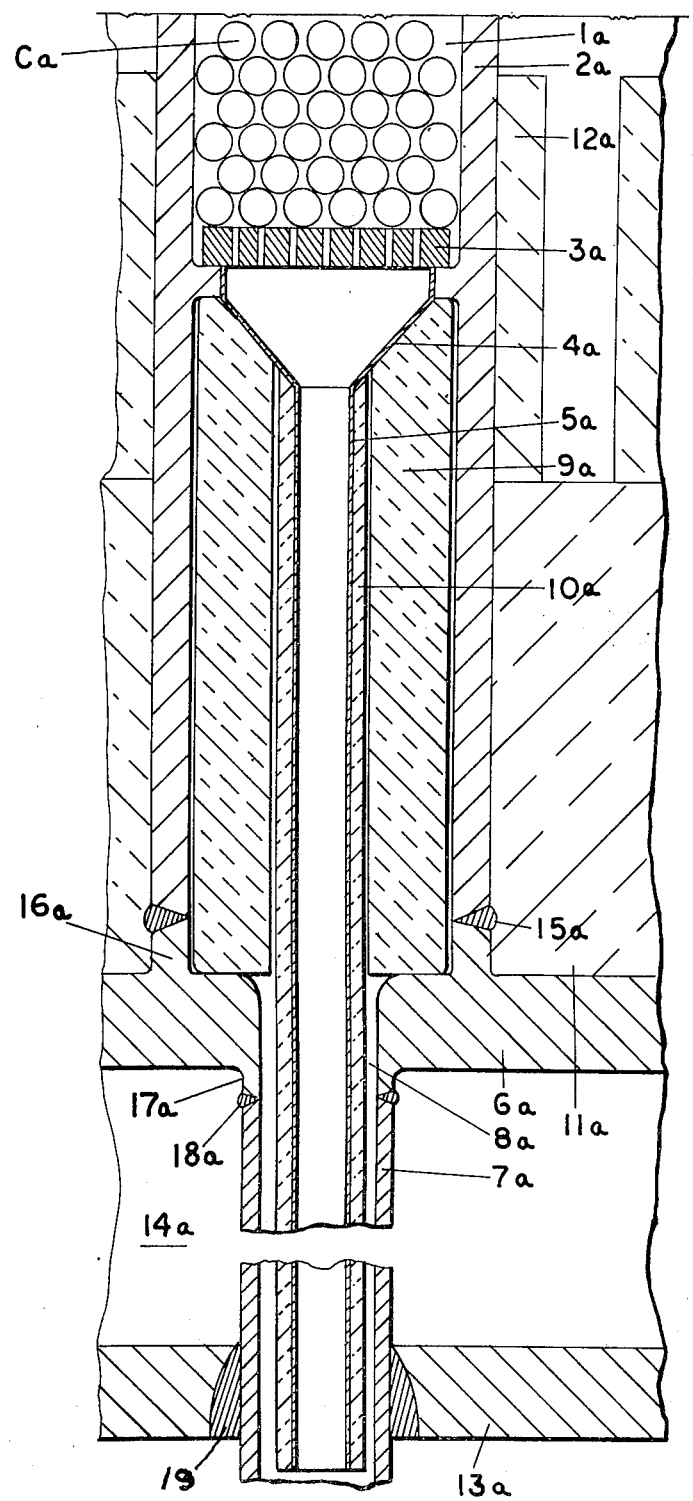
FIG. 2 is a fragmentary sectional view similar to FIG. 1, but showing an alternate structure.

FIG. 2 shows another feature of the invention, the same reference numerals being used as in FIG. 1 but with the exponent a. The insulated process gas discharge tube 5a extends through the entire length of the cooling tube 7a so that the process gas leaves the heat exchanger virtually without any previous cooling. The quantity of cooling water admitted to compartment 14a is limited to the flow rate necessary to lower the temperature of the inner tubesheet 6a to the permissible value.

Figure 3:
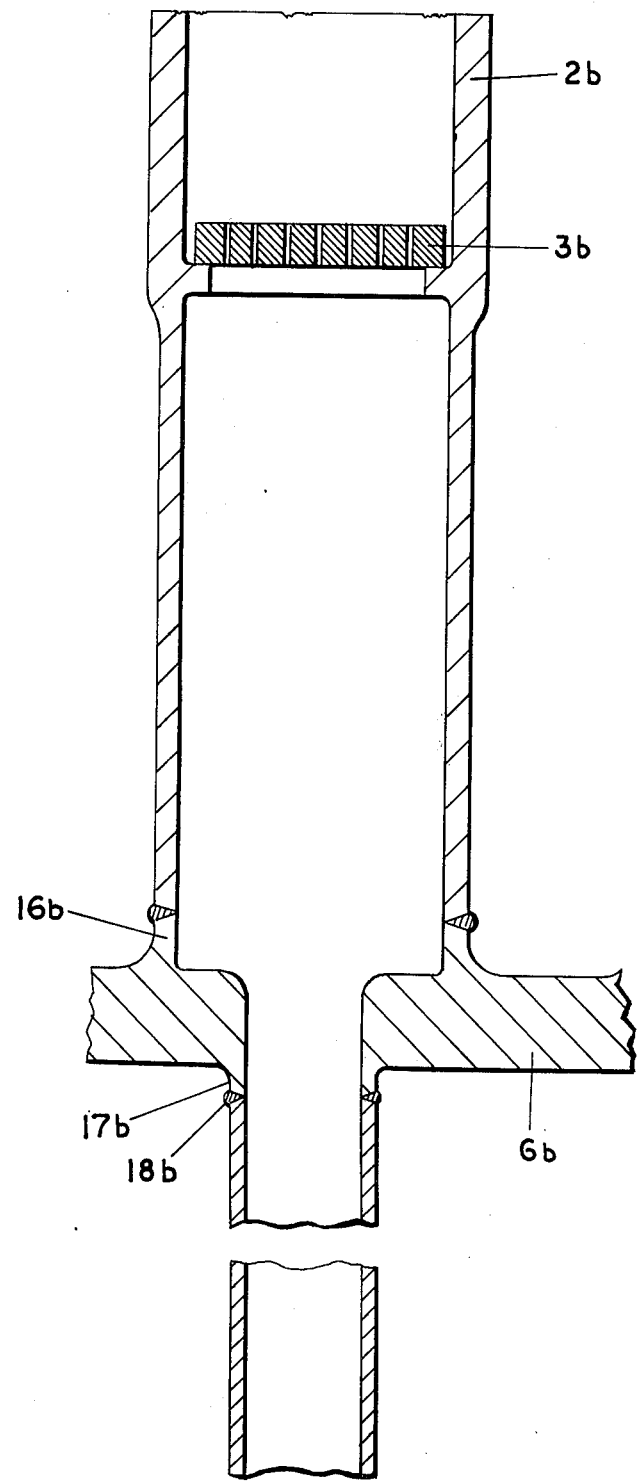
FIG. 3 is a vertical sectional view of a reaction tube showing a modified form in which the tube is of decreased wall thickness.

FIG. 3 illustrates a modified form of reaction tube in which the high wall temperature of tube 2b is reduced in the area between the heated zone and the pressure vessel bottom head (inner tubesheet) 6b, the heat flux to inner tubesheet 6b being decreased by reducing the wall thickness of the tube 2b starting below the catalyst support grid 3b. The transition from the end of the tube 2b to the inner tubesheet 6b may be increased again to the original wall thickness.

In each of the above forms of the invention, it will be understood that a pressure vessel is involved which is provided with an annular row of catalyst-filled reaction tubes such as 2, 2a, and 2b, which are for the purpose of reforming gaseous hydrocarbons mixed with steam. Such mixture is introduced at pressures above 5 atm.g. in the pressure vessel as well as in the reaction tubes, the temperature being in excess of 700°C. The reaction tubes, it will be manifest, are heated by heating gas, there being at least one heating gas inlet nozzle and one heating gas outlet nozzle associated with each tube. Below the inner tubesheet 6, 6a, or 6b it will be understood that there is an integral heat exchanger and the surfaces of such tubesheets are contacted by the heating gas on the upper side and by a cooling fluid on the under side in the heat exchanger compartment 14 or 14a. It will be further understood that the above description and illustration are in respect of one of the units of the pressure vessel, there being a plurality thereof arranged in an annular row, as will be readily understood by those skilled in the art.

What I claim is:

1. In a device for performing catalytic reactions on a process gas, comprising in combination
    a vertically disposed vessel,
    an upright reaction tube in said vessel for receiving the process gas at the upper end portion and discharging the process gas at the lower end portion,
    a grid in the upper portion of said reaction tube for supporting catalyst above the grid,
    a process gas discharge tube of less diameter than said reaction tube and arranged concentrically therewith,
    a connection between the top of said process gas discharge tube and said reaction tube adjacent said grid, and
    thermal insulation between said process gas discharge tube and the inner wall of said reaction tube, the improvement comprising:
    an inner tubesheet through which said process gas discharge tube freely extends,
    an outer tubesheet spaced downstream from said inner tubesheet to provide an heat exchanger space therebetween for reception of a cooling fluid,
    a cooling tube in liquid tight engagement with said inner tubesheet and extending through and rigidly connected to said outer tubesheet,
    said process gas discharge tube extending without physical contact into said cooling tube, and
    a rigid connection between said reaction tube and said upper tubesheet where cooling, insulation and process gas routing combine to reduce the temperature of said reaction tube, said reaction tube comprising heat-resisting steel, and said inner tubesheet comprising normal boiler structural steel.

2. A device as claimed in claim 1, in which said process gas discharge tube beyond said grid is of a length at least equal to the diameter of said reaction tube.

3. A device as claimed in claim 1, further comprising means for heat insulating the process gas discharge tube which extends at least to said outer tubesheet.

4. A device as claimed in claim 1, in which said cooling tube is also of normal boiler structural steel and is welded to said inner tubesheet.

5. A device as claimed in claim 1, in which said reaction tube downstream of said grid is substantially reduced in thickness to a point in close juxtaposition to said inner tubesheet.

* * * * *